Inventor
HAROLD P. KNAUSS

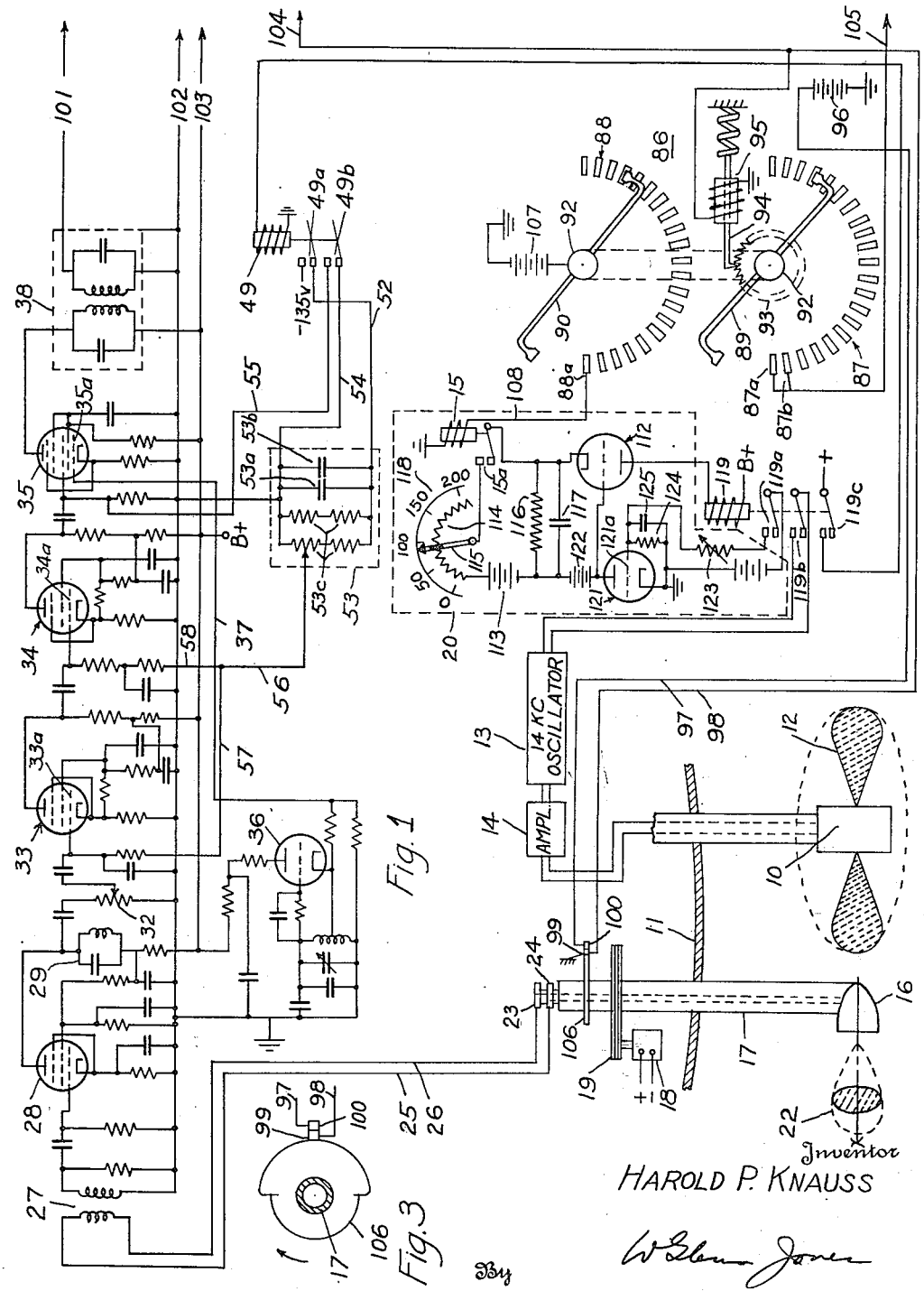
Jan. 12, 1954   H. P. KNAUSS   2,666,191
UNDERWATER SOUND DETECTING AND INDICATING SYSTEM
Filed Oct. 2, 1944                                     4 Sheets-Sheet 1
Inventor
HAROLD P. KNAUSS Jan. 12, 1954 H. P. KNAUSS 2,666,191
UNDERWATER SOUND DETECTING AND INDICATING SYSTEM
Filed Oct. 2, 1944 4 Sheets-Sheet 4

By

Attorney

Patented Jan. 12, 1954

2,666,191

UNITED STATES PATENT OFFICE 2,666,191

UNDERWATER SOUND DETECTING AND INDICATING SYSTEM

Harold P. Knauss, Belmont, Mass.

Application October 2, 1944, Serial No. 556,730

9 Claims. (Cl. 340—3)

This invention relates to apparatus for determining the bearing and range of a source of radiated energy and is particularly directed although not limited, to the determination of the bearing and range of a source of compressional wave energy.

The invention is of special utility in underwater sound echo ranging and is described in this connection in the following specification. However, it should be understood that it is equally applicable in conjunction with other forms of wave energy direction and range finding or indicating systems.

The general object of the invention is to provide an arrangement which improves the accuracy of the range indication in the echo ranging system developed by Oscar Hugo Schuck, the U. S. Patent application for which was filed May 18, 1944, Serial No. 536,172 now Patent #2,473,974.

In that application, there is disclosed an echo ranging system in which pulses of acoustic energy of predetermined duration are emitted intermittently from a transducer, the output characteristics of which are omnidirectional; that is to say the acoustic wave is emitted simultaneously, and preferably with substantially equal intensity, in all directions in a horizontal plane. Echoes of the wave from a target are received by a directionally sensitive transducer which is caused to rotate mechanically at a rate determined by the duration of the emitted pulse.

The period required for one revolution of the receiving transducer determines the duration period of the pulse, the latter being at least equal to the former, so that the receiving transducer will be able to scan the entire underwater horizon during the period that the returning pulse echo is passing through the position of this transducer. Thus if the receiving transducer rotates at 4 R. P. S., the duration period of the transmitted pulse must be at least .25 second.

Accordingly, at some time in the duration period of the returning echo, the directivity pattern of the receiving transducer will be pointed in the direction from which the echo is coming. A cathode ray oscilloscope tube with a spiral beam sweep synchronized with the rotating receiver is utilized in the system, and connections to the tube elements are such that the spirally sweeping beam spot will brighten when an echo is received. Thus the bearing of the beam spot when it brightens relative to the center of the tube screen is always the same as the bearing of the receiver directivity pattern at which the echo pulse is received. The distance of the brightened spot from the center may be calibrated in terms of target range since a spiral sweep begins with each energy pulse transmitted and increases in size uniformly with time after emission of the pulse. For example, with the receiving transducer rotating at 4 R. P. S., or one complete turn each .25 second, corresponding points on adjacent turns of the beam spiral would represent a 200 yard increment change in range of the target.

The beam spot therefore brightens at a point or points corresponding to the range and bearing of such underwater object from which an echo is reflected. A long persistence screen is used to allow easy observation of all the bright spots and so the operator is furnished a continuous pictorial pattern of all targets in the underwater field.

However, as pointed out in the aforesaid application, the range indication is not exact but is subject to an error which is inherent in the system. In particular, it is pointed out in the specification of that application that an indication of an echo is obtained while the annulus of the reflected wave energy is passing through the receiving transducer and that this annulus has a width corresponding to the distance the energy travels through the water in .25 second, the time required for a complete turn of the receiving transducer and a complete turn of the spiral sweep of the beam spot on the screen of the oscilloscope. At some time during this .25 second period, the annulus of wave energy is caught momentarily but it will be evident that it is not known which part of the annulus is so caught. The indication will be the same whether the front or rear of the annulus is caught. The velocity of this energy being about 1600 yards per second, the energy will traverse about 200 yards out and 200 yards back in .25 second. Each .25 second increment of time between a particular instant of transmission of energy from the sending transducer and the receipt of its echo by the receiving transducer means about a 200 yard increment in the target distance. Therefore, knowing the radial distance on the screen of the oscilloscope from the center to the spot at which the electron beam brightens, the distance to the target inferred therefrom is subject to an error up to ±100 yards.

Of course, this error may be reduced by increasing the speed of rotation of the receiving transducer which permits a corresponding decrease in the length of the emitted pulse since it is evident that the amount of the error varies as the time required by the receiving transducer to make one complete turn. However, too great a speed of rotation of the receiving transducer can not be tolerated since this introduces other factors which may be even more undesirable than the error in range indication.

The general object of this invention is therefore to provide an arrangement which reduces the amount of this error in range indication without affecting the rotation rate of the receiving transducer.

In general, this desirable result is attained by extending emission of the wave energy pulse so that its period is slightly longer than the period required for the receiving transducer to make one complete turn. Thus since the width of the wave energy annulus, expressed in terms of time, exceeds the time required for the receiving transducer to make one complete turn, it becomes possible for the rotating receiving transducer to catch the incoming echo annulus of wave energy on two successive turns of the spirally sweeping beam in the oscilloscope. When this is made to happen, there will be two adjacent spot brightenings of the beam on the oscilloscope screen.

Under such conditions, if the duration of the emitted pulse has been increased from .25 second to .275 second and the receiving transducer makes one complete turn each .25 second, the error in range indication will have been reduced from ±100 yards to ±10 yards.

This double indication of the target range on two successive turns of the beam spiral is made to occur by shifting the emitted energy annulus, from a standpoint of time, with respect to the rotation of the receiving transducer and the spirally sweeping beam of the oscilloscope which is synchronized with the latter.

In particular, in this embodiment, the desired shift in the emitted energy annulus is obtained through the use of a delay network which delays emission of the energy pulse relative to the generation of the beam spiral in the oscilloscope. Or to put it another way, emission of the energy pulse is delayed with respect to the position of the receiving or scanning transducer.

The amount of the delay necessary to obtain the double range indication, expressed in terms of range, is then added to the innermost range indication on the oscilloscope screen to obtain the range of the target. This will be more fully explained hereinafter in the following description of a preferred embodiment of the invention and from the accompanying drawings in which:

Fig. 3 is a plan view of the cam and contacts operated thereby for controlling operation of certain of the system's component parts;

Figure 1:
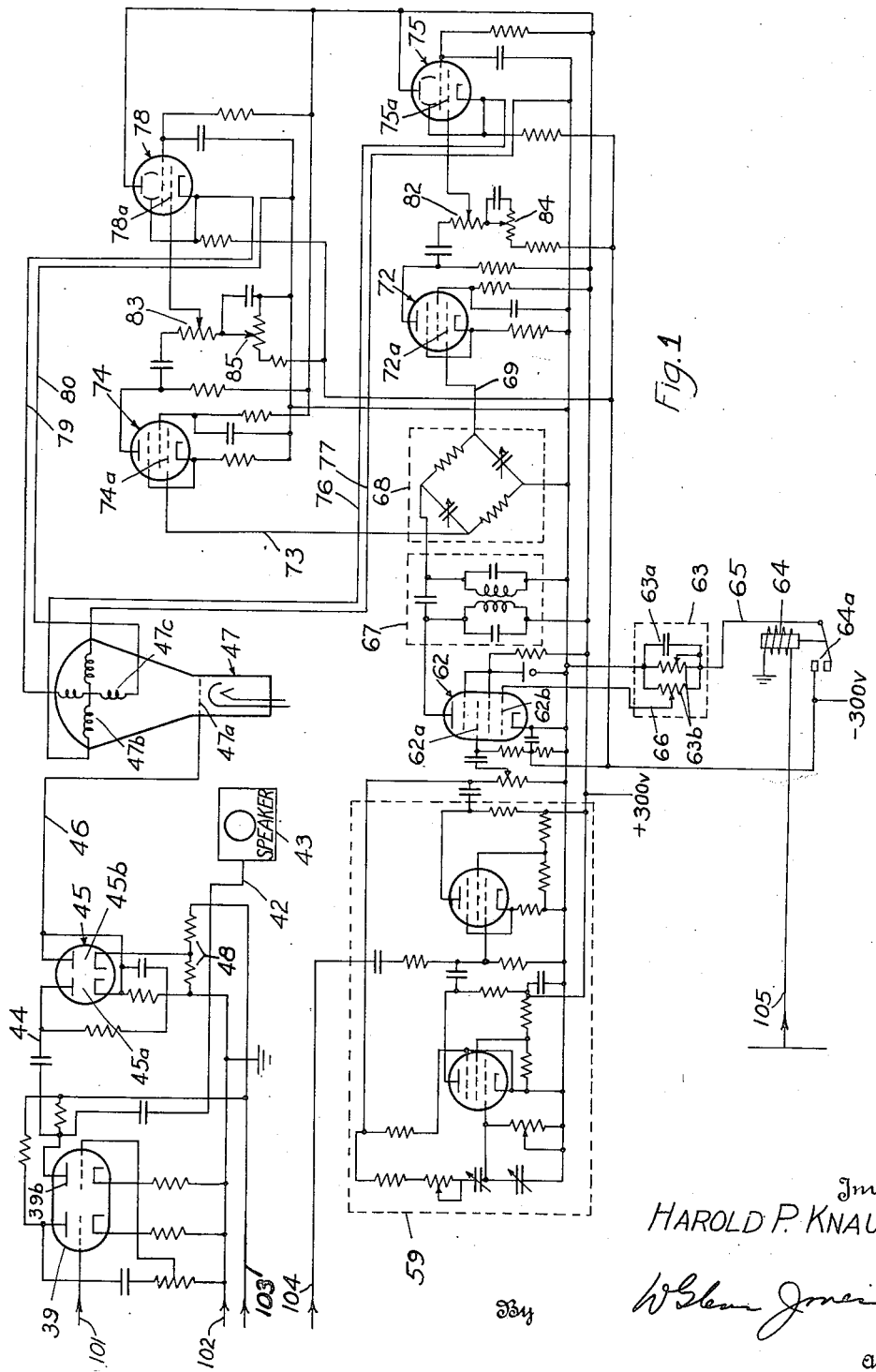
Fig. 1 is a circuit diagram of the improved echo ranging system.
Figure 2:
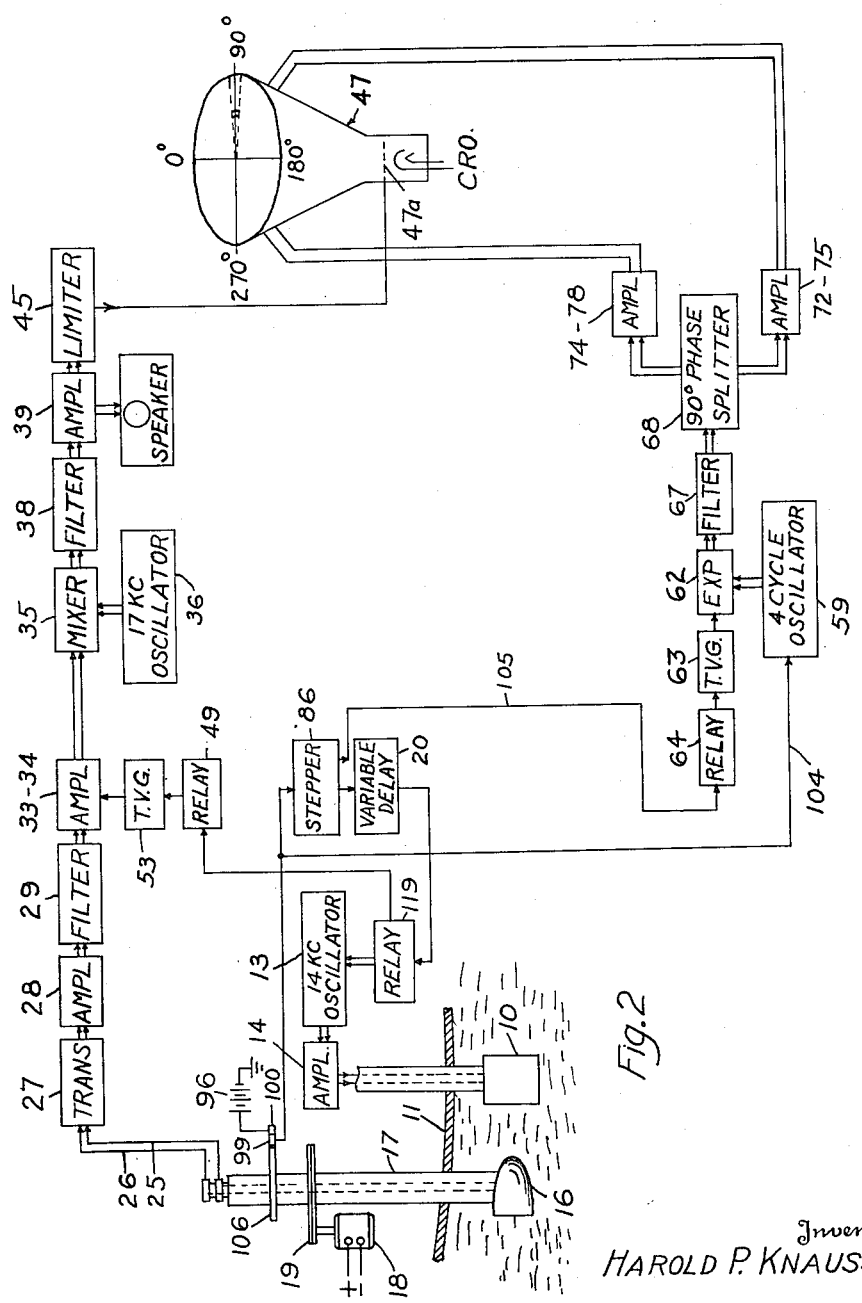
Fig. 2 is a block diagram of the circuit components shown in Fig. 1.

Referring now to Figs. 1 and 2, a transducer 10 for sending out compressional wave energy, preferably of supersonic frequency, is shown projecting down into the water through a ship's hull 11. This transducer is stationary and its design characteristics are omnidirectional; that is to say when it is in operation, the compressional wave energy is emitted therefrom simultaneously and with substantially equal, and relatively great intensity in all directions in a horizontal plane. The intensity in the vertical plane is but very little when compared to that in the horizontal plane and the overall intensity pattern is therefore somewhat toroidal as indicated by reference character 12.

Construction of transducer 10 per se does not form a part of this invention and hence it has not been shown in detail. A magnetostrictive unit of the general type shown in application Serial No. 519,233, filed January 21, 1944, now Patent #2,431,026, by Francis P. Bundy is satisfactory for this purpose. Another type of transducer construction which is satisfactory is shown in application Serial No. 497,232, filed August 3, 1943, by Edwin M. McMillan et al., the latter being a piezoelectric unit.

Transducer 10 is driven from an oscillator 13 of conventional construction, the output of which may be put through an amplifier 14, also of conventional construction, before it is fed into transducer 10.

Oscillator 13 is caused to operate intermittently for predetermined periods by means of a relay 119, the operation of the latter being controlled through a delay apparatus 20, the operation of which will be explained hereinafter in more detail.

Echoes of compressional wave energy emitted from transducer 10 are received by a second transducer 16 which also projects through the ship's hull 11. Transducers 10 and 16 are preferably located very close to each other in space and thus, for purposes of this invention, may be considered as being located on the same vertical axis.

The receiving transducer 16 is mounted upon shaft 17, the latter being adapted to be rotated at a speed of 4 R. P. S. by a motor 18 which may be coupled to shaft 17 by a belt drive 19.

Receiving transducer 16 is of such design that its intensity pattern 22 has a single major and relatively narrow lobe, the axis $x$ of which is perpendicular to the shaft 17 and the active face of the transducer. That is to say, transducer 16 is most sensitive to wave energy coming in along the $x$ axis.

The construction of receiving transducer 16 per se is not a part of this invention and has, therefore, like sending transducer 10, been shown only in general outline.

It may be said, however, by way of general explanation that the desired directional sensitivity is obtained by making the area of the active face of the transducer large with respect to the wave length of the wave energy utilized, and by having all points of this face vibrate in phase although not necessarily with equal amplitude. One suitable construction of a magnetostrictive transducer is shown in U. S. Patent No. 2,063,952, issued December 15, 1936, to R. L. Steinberger.

The active elements of transducer 16 are connected together and brought out by conductor means to two slip rings 23, 24. Conductors 25, 26 lead from slip rings 23, 24 to an input transformer 27 of the receiver. The incoming echo is then amplified in amplifier 28 into a filter group 29. It next passes through an attenuator 32 and from there into two more electronic amplifier stages 33, 34.

The incoming or echo signal is about the same frequency as that of the sending transducer, it being noted that this signal will of course have a certain amount of shift in frequency due to the Doppler effect caused by motion between the vessel upon which the transducers 10 and 16 are mounted and that of the underwater target. The echo signal is then beat in a mixer stage 35 against an output signal from an oscillator 36 of conventional design. The output from oscillator 36 feeds over conductor 37 into a control grid 35a of mixer 35.

In the particular system disclosed, oscillator 13 is set to 14 kc. and that of oscillator 36 set to 17 kc. Thus the difference frequency output from mixer 35 which will be at approximately 3 kc. is fed through a 3 kc. band pass filter 38 and into a double triode 39 from the second plate 39b of which the signal is taken over conductor 42 to a loudspeaker 43 whereby the echo signal may be heard by an operator.

The incoming echo signal is also fed over conductor 44 into a double diode limiter 45 and thence over conductor 46 to the signal grid 47a of a cathode ray oscilloscope 47.

Signals below a predetermined level will reach conductor 46 through the left half 45a of limiter 45 while signals that are above this level come back through the right half 45b of limiter 45 to ground, half 45b being biased through a resistor 48.

It is desirable to block out the receiver portion of the system while the sending transducer 10 is in operation and also for a short time thereafter. Otherwise the signals which would be picked up by receiving transducer 16 direct from transducer 10 and from the intense reverberation which follows immediately at the end of each transmission of a pulse of compressional wave energy would damage the elements of the oscilloscope 47. Also by suppressing reverberation, a true echo of the wave energy from a target may be more easily distinguished on the oscilloscope screen.

This desired effect is accomplished by applying a high negative voltage, about −135 volts from a suitable source through contacts 49a of relay 49 when energized, conductor 52, a time varied gain network 53 (labeled TVG in a block diagram, Fig. 2), conductor 54, relay contacts 49b and conductor 55 to a control grid of mixer 35. Control for relay 49 will also be explained hereinafter in more detail.

Also at the time relay 49 is energized, capacitors 53a, 53b of the network 53 are charged to −135 volts from this same source. This potential is applied through conductors 56, 57 and 58 to the control grids 33a and 34a of amplifiers 33 and 34 respectively. However, when relay 49 opens, the charge on capacitors 53a, 53b will gradually leak off through resistor set 53c of the network 53, the time constant for condenser discharge being of course dependent upon the resistance of the resistor set 53c. Amplifiers 33 and 34 are therefore unblocked at the same rate as the discharge of capacitors 53a and 53b so that by the time an echo of the transmitted energy pulse is received, the normally high gain of amplifiers 33, 34 is restored. Thus amplifiers 33, 34 yield a time varied gain.

In this system, the beam spot of the cathode ray oscilloscope 47 is caused to make periodic spiral sweeps, each such sweep beginning at the center of the oscilloscope screen when the energy pulse is sent out from transducer 10 and expanding outwardly to the edge of the screen.

The apparatus for effecting this spiral sweep comprises a 4 cycle RC square wave generator oscillator 59. The output from oscillator 59 feeds into control grid 62a of an expander tube 62. The gain of tube 62 is controlled through a second time varied gain network 63 and relay 64. Operation of relay 64 which is periodic will be explained in further detail hereinafter. However, with relay 64 closed, a negative potential from a source labeled −300v is applied through relay contacts 64a, conductor 65, network 63 and conductor 66 to a control grid 62b of tube 62 to thereby reduce the gain of this tube to substantially a zero value. Condenser 63a of network 63 is also charged at this time.

When relay 64 opens, condenser 63a will begin to discharge through resistor 63b which gradually increases the gain of tube 62. This periodic application of time varied gain of the output of oscillator 59 in expander 62 causes the beam spot of the oscilloscope 47 to periodically expand outwardly from the center of the oscilloscope screen as shown clearly in Fig. 5.

From expander 62 the 4 cycle oscillator output is passed through a band pass filter 67 tuned to 4 cycles and is then put through an RC bridge network 68 which functions to split the 4 cycle output into two components 90° apart in phase.

A first component of the oscillator output is taken out of the bridge network 68 via conductor 69 to grid 72a of a power amplifier 72. Similarly a second component of oscillator output (now 90° out of phase with the first component) is taken out of the other side of the bridge network 68 via conductor 73 to grid 74a of power amplifier 74.

The output from amplifier 72 is then fed into the control grid 75a of tube 75, in the cathode circuit of which is connected via conductors 76, 77, the horizontal set of beam deflecting coils 47b of the oscilloscope 47. Similarly the output from amplifier 74 is fed into control grid 78a of tube 78, in the cathode circuit of which is connected via conductors 79, 80, the vertical set of beam deflecting coils 47c of oscilloscope 47.

This 2 phase output of oscillator 59 with time varied gain through expander 62 gives the desired spiral sweep to the beam spot.

Potentiometers 82, 83 between tubes 72, 75, and 74, 78 respectively serve as volume controls. Potentiometers 84, 85 similarly located function as a centering control for the electron beam spot on the screen of the oscilloscope 47.

For periodically energizing the sending transducer 10, this system makes use of a stepping mechanism 86 which comprises two contact sets 87, 88 of 21 contacts each, the contacts being spaced equally in a half circle. These contacts are wiped by double contact arms 89, 90 which rotate together on a common shaft 92. A ratchet gear 93 is fixedly mounted upon shaft 92. Coacting with gear 93 is an arm 94 which moves transversely when solenoid 95 is energized. Travel of arm 94 is such that arms 89, 90 will move up one contact on the contact sets 87, 88 each time that solenoid 95 is energized. The latter is periodically energized from a suitable source 96 through conductors 97, 98 and contacts 99, 100 which are closed periodically by means of a cam 105 fixedly mounted on shaft 17, this being clearly shown in Fig. 3. Cam 105 has a 180° land. Hence contacts 99, 100 will be closed for .125 second on each revolution of shaft 17 since the latter, as previously described, rotates at 4 revolutions per second or one complete revolution each .25 second.

Thus solenoid 95 is energized once for each revolution of shaft 17 and hence arms 89, 90 of the stepping mechanism 86 will step up one contact on the contact sets 87, 88, for each revolution of shaft 17.

Or to put it another way, arms 89, 90 remain on each contact for .25 second. It will thus be apparent that for each 20 impulses of current applied to solenoid 95 by the make and break between cam operated contacts 99, 100, either the top or bottom portion of arm 90 will make contact with the extreme left hand contact 88a of contact set 88. When this happens, a potential from source 107, one side of which is grounded, is applied through shaft 92, arm 90, contact 88a, and conductor 108 to the winding of relay 15.

In a similar manner, when arm 89 makes contact with contacts 87a, 87b of the contact set 87, the potential from source 107 is applied through arm 89, contacts 87a, 87b, and conductor 105 to the winding of relay 64.

Also each time that contacts 99, 100 close, the potential from source 96 is applied over conductor 104 to oscillator 59 and functions as a synchronizing pulse for synchronizing the turns of the spiral sweep of the beam spot with those of the receiving transducer 16.

In the aforesaid Schuck application, each time that arm 90 was in contact with contact segment 88a, a relay energized over conductor 108 functioned to connect the output of oscillator 13 to the elements of transducer 10 for a period of .25 second. However, as stated in an earlier part of this specification, the pulse period of this invention is made slightly longer than .25 second, for example, .275 second, and further, the emission of the pulse is adjustably delayed relative to the expanding beam spiral in the oscilloscope to the end that an indication of range may be made to appear on two successive turns of the beam spiral.

The apparatus for accomplishing these results is contained within the broken line block 20 in Fig. 1. It includes a thyratron 112, the grid circuit of which includes a biasing potential 113, variable resistor 114 wiped by arm 115, fixed resistor 116, capacitor 117, and relay contacts 15a of the previously mentioned relay 15, the winding of the latter being energized each time wiper arm 90 connects with contact 88a.

Resistors 114, 116 and capacitor 117 determine the time constant of the grid circuit of tube 112 and hence determine the amount of delay of the pulse transmission. This delay as hereinbefore explained is calibrated in yards which may be indicated on a scale 118, the indicator for which may also be arm 115.

Thus when relay contacts 15a close, tube 112 will fire after the aforementioned delay period which permits plate current to flow through the winding of relay 119 from the B+ supply source thus closing its contacts. Closure of relay contacts 119b connects the output of oscillator 13 through amplifier 14 to transducer 10; closure of contacts 119c serves to connect a power source to the winding of relay 49; closure of relay contacts 119a closes the grid circuit of tube 121 which may be a 6J5, and drives its grid 121a more and more negative until this tube finally cuts off. When this occurs, the cathode of the thyratron 112 is cut loose from ground by battery 122 causing it to be extinguished at which time the contacts of relay 119 will open and cut off oscillator 13.

The time required for the grid of tube 121 to be driven sufficiently negative to cause it to cut off is determined by its time constant components which may comprise a variable resistor 123, fixed resistor 124, and capacitor 125.

It will thus be seen that the delay period may be varied as becomes necessary (from 0 to .25 second) by adjustment of arm 115 and the duration of the emitted pulse may be suitably adjusted to .275 second by changing the value of resistor 123.

*Operation*

Transducer 16 is set into rotation by the motor 18 at a speed of 4 revolutions per second. Contacts 99, 100 are then closed once in each revolution of shaft 17 by the cam 106 and, upon each such closure of these contacts, arms 89, 90 of the stepping mechanism 86 are moved successively from contact to contact of the contact sets 87, 88.

When contact arm 89 reaches contact 87b, relay 64 will pull in and close its contacts 64a whereupon the negative potential of −300 volts will be applied to a blocking grid 62b of expander 62 thereby reducing the gain of the output of oscillator 59 to substantially a zero value at this time. The same condition also holds true as contact arm 89 passes to contact 87a.

Figure 4:
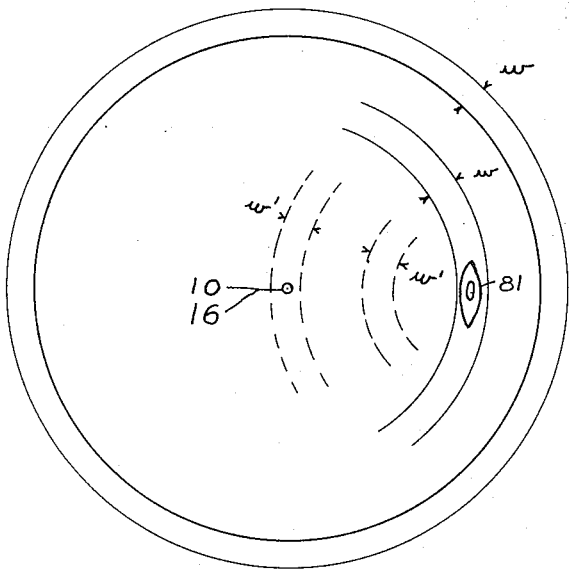
Fig. 4 is a plan view of an underwater field showing the nature of the compressional wave energy as emitted by the sending transducer and the reflection of such energy from an underwater target.

Next, when contact arm 90 reaches contact 88a, relay 15 pulls in and closes its contacts. As previously explained, closure of relay contacts 15a completes the grid circuit for thyratron 112. At the end of the delay period as determined by the time constant of its grid circuit, thyratron 112 fires causing current to flow through the winding of relay 119 to close its contacts. Closure of relay contacts 119b connects the output of oscillator 13 through amplifier 14 to the transducer 10 and a pulse of compressional wave energy, which is substantially uniform in all directions in a horizontal plane, is emitted for as long as thyratron 112 is conductive. This period is determined by the time constant of the grid circuit of tube 121 and is adjusted to .275 second. Thus, an annulus of compressional wave energy having a width $w$ equal to the distance that the energy travels through the water in .275 second (approximately 440 yards) as shown in Fig. 4 spreads out from transducer 10.

As relay 49 pulls in upon closure of relay contacts 119c, a negative potential of about −135 volts is applied to the grids 33a, 34a of amplifiers 33, 34 and thereby prevents energy emitted directly from transducer 10, which will obviously be picked up by the receiving transducer 16, from getting through the receiver portion of the system. As previously described, this is desirable to prevent damage to elements of the cathode ray oscilloscope 47.

As arm 90 passes out of engagement with contact 88a, relay 15 is deenergized. In the aforesaid Schuck application, opening of a relay corresponding to this relay functioned to terminate pulse emission from transducer 10. However, in this improvement, opening of relay 15 functions only to ready the grid circuit of thyratron 112 for the next operation, it being well known that once the thyratron has begun to discharge, its grid losses control until the tube discharge is extinguished. Therefore, relay 119 will remain energized for as long as tube 112 remains conductive. This period is adjusted to .275 second as previously explained.

When relay 119 becomes deenergized at the end of the .275 second period and its contacts are opened, the break between relay contacts 119b disconnects the output from oscillator 13 thus terminating the emitted energy pulse.

Opening of the contacts of relay 49 with the break between relay contacts 119c removes the maximum blocking potential which was placed on the grids 33a and 34a of amplifiers 33 and 34 and substitutes a blocking potential, the value of which decreases with time in accordance with the rate of discharge of condensers 53a, 53b through resistor set 53c of the time varied gain network 53. Immediately after the termination of emission of compressional wave energy from transducer 10, the gain of amplifiers 33, 34 is much reduced and therefore the intense reverberation of such energy which follows will have little effect upon the cathode ray oscilloscope. However, the blocking action of condensers 53a, 53b upon amplifiers 33, 34 gradually decreases and thus by the time an echo arrives, the normally high gain of these amplifiers is restored and the echo signal will thus pass through amplifiers 33, 34 and be unaffected by the time varied gain just described.

As arm 89 passes out of engagement with contact 87a, relay 64 is deenergized and its contents opened.

As relay 64 opens its contacts, the 4 cycle output from oscillator 59 will begin to flow through the expander 62 increasing with time as determined by the unblocking of tube 62 through the discharge of condenser 63a of the time varied gain network 63. This 4 cycle output of increasing intensity then passes through filter 67, and is split into two components 90° apart in phase, one component then being fed onto the horizontal beam deflecting coils 47b of the oscilloscope 47 and the other component being fed onto the vertical beam deflecting coils 47c of this oscilloscope.

Figure 5:
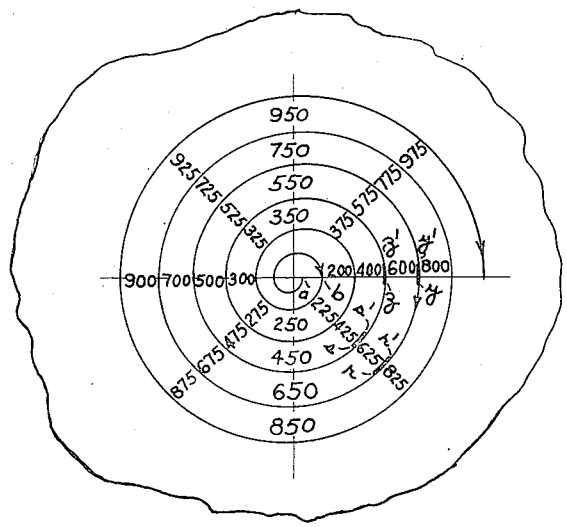
Fig. 5 is a view showing how the range and bearing indication of the target shown in Fig. 4 might appear on the screen of the oscilloscope associated with the system.

The effect is to produce a spiral sweep of the beam spot in the oscilloscope as shown in Fig. 5, the spiral beginning at or near its center simultaneously with the opening of relay 64. It is evident that this spiral sweep of the beam spot is not visible on the screen of the oscilloscope since no potential is applied to the brightening grid 47a of the oscilloscope until an echo is received.

Synchronism between consecutive turns of the spiral sweep of the beam spot and turns of the receiver transducer 16 is maintained by impulses which are applied from source 96 upon each closure of contacts 99, 100 to oscillator 59 via conductor 104 as previously described.

Referring now to Fig. 4, when the annulus of wave energy having the width w emitted from transducer 10 strikes an underwater target 81, it is reflected therefrom, the target 81 now serving as a source of the reflected energy which will likewise be an annulus of width w' and of increasing circumference.

As previously described, at some time during the duration time that the reflected energy is passing the receiving transducer 16, the directivity pattern 22 thereof shown in Fig. 1 will be pointed in the direction from which the echo is coming. This energy will therefore be picked up by transducer 16 and put through the receiver portion of the system, appearing at the output of limiter 45 as a potential which is impressed upon the brightening grid 47a of the oscilloscope 47 causing the spirally sweeping beam spot which has been expanding outwardly during this time to brighten over a relatively narrow path for a short distance such as y—y' on the oscilloscope screen. Thus since the spiral sweep of the beam spot is synchronized with rotation of the receiving transducer 16, the bearing at which the brightening of the beam spot appears upon the screen will be the same as the bearing of the transducer 16 at the instant the echo was received from target 81. The true bearing of target 81 therefore will be a bearing which is the mean of the distance y—y' which represents brightening of the beam spot.

Since the expansion spirally of the beam spot from the center of the oscilloscope screen increases directly with time after the pulse of wave energy is sent out from transducer 10, range of the target 81 from the transducers 10, 16 may thus be indicated directly on the screen by suitably calibrating its face as shown in Fig. 5.

As previously discussed, an echo indication is gained while the echo wave annulus w' is passing through the receiving transducer 16. In the aforesaid Schuck application, this annulus had a width corresponding to the distance the energy traveled through the water in .25 second, the time during a complete turn of the transducer 16 and a complete turn of the spiral on the screen of the oscilloscope. At some time during that .25 second period, the annulus w' was caught momentarily but it was not known which part of the annulus was so caught. The indication on the oscilloscope screen was the same whether the front, rear or middle portion of the annulus was intercepted. The velocity of the energy in water being about 1600 yards per second, the energy traverses about 200 yards out and 200 yards back in .25 second. Each .25 second increment of time between a particular instant of the pulse and receipt of its echo therefore means about a 200 yard increment in the target distance. Accordingly the distance to the target inferred from the indication on the oscilloscope screen was subject to an error of +100 yards.

However, according to this invention, since the duration of the pulse has been increased to .275 second, and the receiving transducer and beam spiral still make one complete turn each .25 second, it becomes possible for the receiving transducer 16 to catch the incoming annulus w' on two successive turns of the spiral. When this possibility is realized, it means that there will be two adjacent spot brightenings on the oscilloscope screen as at y—y' and z—z' in Fig. 5.

Hitherto, the description has been based upon the assumption that the delay network 20 in Fig. 1 has been set for zero delay. By that, it is meant that the spiral sweep of the oscilloscope beam is initiated simultaneously with termination of the emitted pulse. If the operator gets only a single spot brightening as at y—y' instead of as at both y—y' and z—z' in Fig. 5, he then adjusts arm 115 to put in more and more delay up to a possible .25 second. This actually advances the pulse transmission with respect to the generation of the beam spiral or, in other words, virtually delays the generation of the beam spiral relative to pulse transmission until, at some stage of the adjustment, the echo annulus of the pulse will register on the next preceding turn of the spiral, that is, at z—z' as well as y—y'.

As previously described, the arm 115 may move over scale 118 calibrated from 0 to 200 yards, corresponding to delays of from .0 to .25 second. To get the target distance, which is then accurate to within ±10 yards, the reading on scale 118 is added to the distance inferred directly from the radial distance indicated on the screen of the oscilloscope as will now be explained more in detail.

Let it be assumed that the face of the oscilloscope screen is marked with distances as indicated in Fig. 5. With the delay arrangement 20 set at 0, let it be assumed that there is a spot brightening at both $y$—$y'$ and $z$—$z'$. This will mean that the target distance is about 600 yards, this figure appearing on the oscilloscope screen between the spots $y$—$y'$ and $z$—$z'$. The explanation of this interpretation is as follows:

The energy pulse begins shortly before the beam spot leaves the center of the screen, continues, and ends shortly after the spot has completed its first turn of the spiral; that is, the pulse is in progress from a time a little before the spot is at "$a$" to a time a little after it is at "$b$." The target being actually at 600 yards, the distance thereto and back is 1200 yards, which is covered in .75 second. In that time, the front end of the energy annulus has gone out and back; and in that same time the spiral has been traced three full turns. Accordingly, there is a spot brightening at $z$—$z'$ due to the return of the front end of the reflected annulus $w'$; .25 second later, the back end of the reflected annulus $w'$ will have reached the receiving transducer 16, another full turn of the beam spiral has been traced and there is a second spot brightening at $y$—$y'$.

As compared with the above conditions for spot brightening at both $y$—$y'$ and $z$—$z'$, let it be assumed that the target lies about 45° clockwise of the first position as viewed in Fig. 5 so that the brightening occurs at $r$—$r'$ and $s$—$s'$. The corresponding distance indicated on the oscilloscope screen is about 625 yards. The increment of 25 yards is .125 of 200 yards and corresponds to .125 of a full turn of the beam spiral.

Suppose, however, under the last stated condition, the spot brightening occurs only at $r$—$r'$. This means that the front end of the reflected energy annulus $w'$ had not reached the receiving transducer 16 when the beam spot was at $s$—$s'$. The operator now introduces through adjustment of arm 115 a gradually increasing delay in the network 20. This delays the arrival of the beam spot at $s$—$s'$ so that eventually it will brighten at $s$—$s'$ as well as $r$—$r'$. The distance corresponding to the delay as read on scale 118 should then be added to the distance indicated on the oscilloscope screen; that is, the scale reading should be added to 625. Similarly, if there is brightening only at $y$—$y'$, the distance corresponding to the delay necessary to produce brightening at $z$—$z'$ as well as $y$—$y'$ should be added to 600.

In the system which has been described, there are 20 stepping operations over each of the contact sets 87, 88. Therefore, since arms 89, 90 step up one contact each .25 second, the energy transmitting transducer 10 will send out a pulse of wave energy each 5 seconds. Compressional wave energy travels through water at a speed of approximately 1600 yards per second. Allowing one half of the time interval between successive periods of energy transmission by transducer 10 as the maximum time over which any echo may be received before the next impulse is sent out, it will be seen that the present system has a theoretical effective range of 4000 yards. However, the maximum range is only about 3600 yards because in the present system, the sweep of the beam spot over the oscilloscope screen will expand spirally for only a 4.75 seconds period at which time relay 64 again becomes energized (due to contact between arm 89 and contact 87b) to again place the negative blocking potential on the grid 62b of tube 62 which causes the beam spot to fly back to the center of the oscilloscope screen. Transducer 10 is again energized after interposing whatever delay may be necessary and the cycle repeated.

Through adjustment of potentiometers 82, 83, the spiral sweep of the beam spot is preferably made to reach the outer edge of the oscilloscope screen just before fly-back occurs.

The effective range of the system may of course be varied such as by changing the number of contacts on the stepping mechanism 86. Thus for a lesser range, mechanism 86 might count 10 steps instead of 20 as in the present embodiment.

In conclusion, it will be evident that various changes may be made in the present embodiment without departing from the spirit and scope of the invention as defined in the appended claims.

Further as stated in an earlier part of this specification, the invention may be applied to other forms of echo ranging apparatus utilizing other forms of wave energy.

As used herein, the term "transducer" is intended to include any device capable of changing wave energy received by it into electrical energy and vice versa.

Having thus fully described my invention, I claim:

1. Apparatus for determining the range of a target in a field comprising an omnidirectional transducer for emitting a pulse of wave energy into said field, a directionally sensitive transducer for scanning said field to pick up an echo of said energy pulse as reflected by said target, said emitted energy pulse period being slightly longer than the period required for one complete scanning of said field by said scanning transducer, means visually simulating said field, marker means spirally sweeping said field simulating means synchronously with operation of said scanning transducer, and means for adjusting initiation of said energy pulse with respect to the position of said scanning transducer so that the latter will intercept an incoming echo of said energy pulse on two successive scannings of the field, and means for producing indications on said field simulating means by said marker means on adjacent spiral turns of the latter corresponding to each said interception of said echo pulse by said scanning transducer to thereby indicate the range of said target.

2. Apparatus for determining the range of a target in a field comprising an omnidirectional transducer for emitting a pulse of wave energy into said field, a directionally sensitive transducer for scanning said field to pick up an echo of said energy pulse as reflected by said target, said emitted pulse period being slightly longer than the period required for one complete scanning of said field by said scanning transducer, means visually simulating said field, marker means spirally sweeping said field means visually simulating synchronously with operation of said scanning transducer, and means for delaying initiation of said energy pulse with respect to the position of said scanning transducer so that the latter will intercept an incoming echo of said energy pulse on two successive scannings of said field, and means for producing indications on said field simulating means by said marker means on adjacent spiral turns of the latter corresponding to each said interception of said echo pulse by said scanning transducer to thereby indicate the range of said target.

3. Apparatus for determining the range of a target in an underwater field comprising an omnidirectional transducer for emitting a pulse of compressional wave energy into said field, a directionally sensitive transducer for scanning said field to pick up an echo of said energy pulse as reflected by said target, said emitted pulse being slightly longer than the period required for one complete scanning of said field by said scanning transducer, means visually simulating said field, marker means spirally sweeping said field simulating means synchronously with operation of said scanning transducer, means for adjusting initiation of said energy pulse with respect to the position of said scanning transducer so that the latter will intercept an incoming echo of said energy pulse on two successive scannings of said field, and means for producing indications on said field simulating means by said marker means on adjacent spiral turns of the latter corresponding to each said interception of said echo pulse by said scanning transducer to thereby indicate the range of said target.

4. Apparatus for determining the range of a target in a field comprising an omnidirectional transducer for emitting a pulse of wave energy into said field, a directionally sensitive transducer, means for rotating the optimum receiving direction of last said transducer for scanning said field to pick up an echo of said energy pulse as reflected from said target, said emitted pulse period being slightly longer than the period required for one complete turn of the optimum receiving direction of said scanning transducer, means visually simulating said field, marker means spirally sweeping said field simulating means synchronously with operation of said scanning transducer, means for adjusting initiation of said energy pulse with respect to the position of the optimum receiving direction of said scanning transducer so that the latter will intercept an incoming echo of said energy pulse on two successive turns thereof, and means for producing indications on said field simulating means by said marker means on adjacent spiral turns of the latter corresponding to each said interception of said echo pulse by said scanning transducer to thereby indicate target range.

5. Apparatus for determining the range of a target in a field comprising a transducer for emitting a pulse of wave energy simultaneously in all directions in a horizontal plane in said field, a second and directionally sensitive transducer for receiving an echo of said energy pulse from said target, means for rotating said second transducer, said emitted energy pulse being slightly longer than the period required for one complete turn of said second transducer, means visually simulating said field, marker means spirally sweeping said field simulating means synchronously with rotation of said second transducer, means for adjusting initiation of said energy pulse with respect to the position of said second transducer so that the latter will intercept on incoming echo pulse on two successive turns of said second transducer, and means for producing indications on said field simulating means by said marker means on adjacent spiral turns of the latter corresponding to each said interception of said echo pulse by said second transducer to thereby indicate target range.

6. Apparatus for determining the range of a target in a field comprising an omnidirectional transducer for emitting a pulse of wave energy into said field, a directionally sensitive transducer, means for rotating the optimum receiving direction of last said transducer for scanning said field to pick up an echo of said energy as reflected from said target, said emitted energy pulse period being slightly longer than the period required for one complete turn of the optimum receiving direction of said scanning transducer, an oscilloscope including a screen and means for producing a cathode beam adapted to impinge thereon, means synchronized with the operation of said scanning transducer for subjecting the beam in said oscilloscope to a spiral sweep, means for adjusting initiation of said emitted energy pulse with respect to the position of the optimum receiving direction of said scanning transducer so that the latter will intercept an incoming echo of said energy pulse on two successive turns thereof, and means for brightening said spirally sweeping beam on adjacent turns of said spiral corresponding to each said interception of said echo pulse by said scanning transducer to indicate the range of said target on the oscilloscope screen.

7. Apparatus for determining the range of a target in a field comprising a first transducer for emitting a pulse of wave energy into said field, said energy being substantially uniform in a horizontal plane, a second and directionally sensitive transducer for receiving echoes of said energy pulse from said target, means for rotating said second tranducer, said emitted energy pulse period being slightly longer than the period required for one complete turn of said second transducer, an oscilloscope including a screen and means for producing a cathode beam adapted to impinge thereon, means synchronized with the rotation of said second transducer for subjecting the beam in said oscilloscope to a spiral sweep, means for adjusting initiation of said emitted energy pulse with respect to the position of said second transducer so that the latter will intercept an incoming echo of said energy pulse on two successive turns thereof, and means for brightening said spirally sweeping beam on adjacent turns of said spiral corresponding to each said interception of said echo pulse by said second transducer to indicate the range of said target on the oscilloscope screen.

8. Apparatus for determining the range of a target in a field comprising a transducer for emitting a pulse of wave energy simultaneously in all directions into said field, a directionally sensitive transducer, means for rotating the optimum receiving direction of last said transducer for scanning said field to pick up an echo of said energy as reflected from said target, said emitted energy pulse period being slightly longer than the period required for one complete turn of the optimum receiving direction of said scanning transducer, an oscilloscope including a screen and means for producing a cathode beam adapted to impinge thereon, means synchronized with the operation of said scanning transducer for subjecting the beam in said oscilloscope to a spiral sweep, means for delaying initiation of said emitted energy pulse with respect to the position of the optimum receiving direction of said scanning transducer so that the latter will intercept an incoming echo of said energy pulse on two successive turns thereof, and means for brightening said spirally sweeping beam on adjacent turns of said spiral corresponding to each said interception of said echo pulse by said scanning transducer to thereby indicate the range of said target on the oscilloscope screen.

9. Apparatus for determining the range of a target in an underwater field comprising a transducer for emitting a pulse of compressional wave energy simultaneously in all directions in a horizontal plane into said field, a directionally sensitive transducer, means for rotating the optimum receiving direction of last said transducer for scanning said field to pick up an echo of said energy pulse as reflected from said target, said emitted energy pulse being slightly longer than the period required for one complete turn of the optimum receiving direction of said scanning transducer, an oscilloscope including a screen and means for producing a cathode beam adapted to impinge thereon, means synchronized with rotation of the optimum receiving direction of said scanning transducer for subjecting the beam in said oscilloscope to a spiral sweep, means for adjusting initiation of the said emitted energy pulse with respect to the optimum receiving direction of said scanning transducer so that the latter will intercept an incoming echo of said energy pulse on two successive turns thereof, and means for brightening said spirally sweeping beam on adjacent turns of its spiral path corresponding to each said interception of said echo pulse by said scanning transducer to thereby indicate target range on the oscilloscope screen.

HAROLD P. KNAUSS.

References Cited in the file of this patent

UNITED STATES PATENTS

| Number | Name | Date |
| --- | --- | --- |
| 2,130,913 | Tolson | Sept. 20, 1938 |
| 2,231,929 | Lyman | Feb. 18, 1941 |

FOREIGN PATENTS

| Number | Country | Date |
| --- | --- | --- |
| 497,147 | Great Britain | Dec. 9, 1938 |
| 546,202 | Great Britain | July 2, 1942 |